Dec. 1, 1942.  C. G. PULLIN  2,303,707
ROOT MOUNTING FOR ROTOR BLADES
Filed Jan. 18, 1940  3 Sheets-Sheet 1
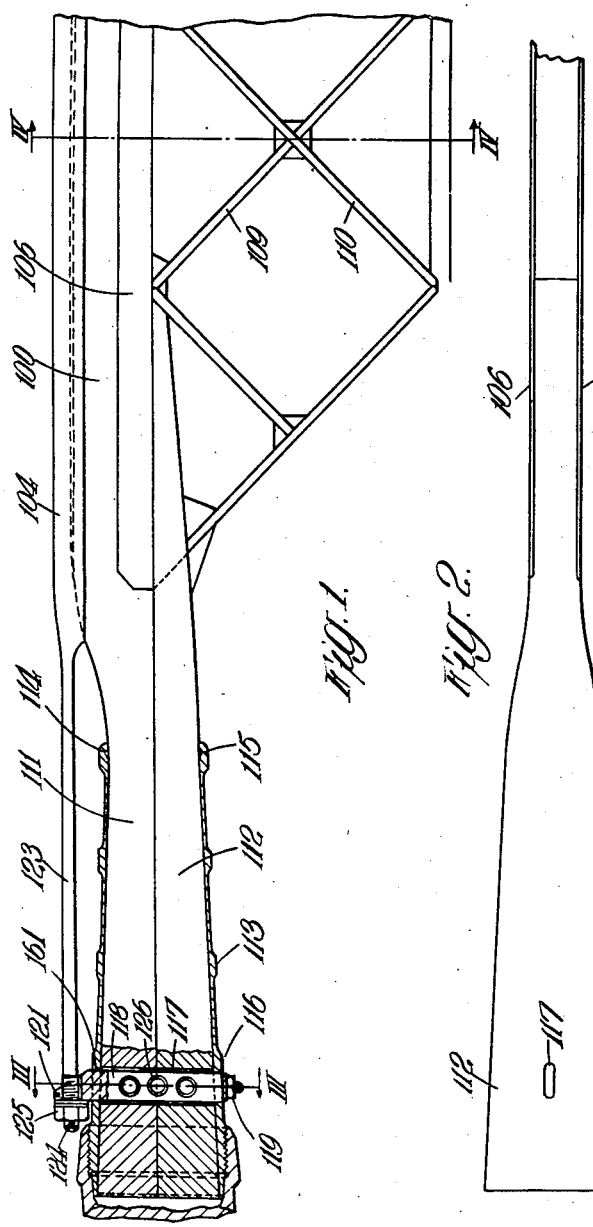
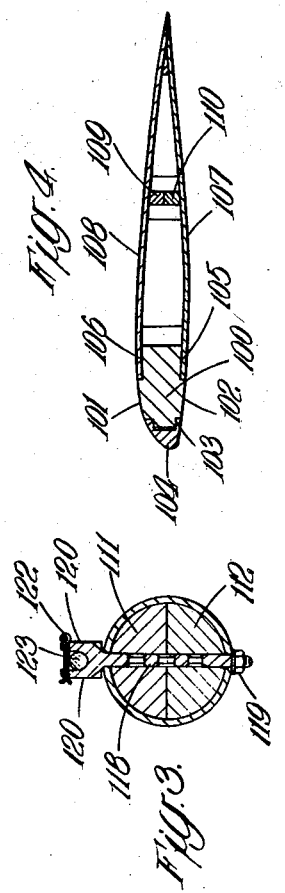
INVENTOR
Cyril George Pullin
ATTORNEYS
Symmestvedt & Lechner Dec. 1, 1942.　　　C. G. PULLIN　　　2,303,707
ROOT MOUNTING FOR ROTOR BLADES
Filed Jan. 18, 1940　　　3 Sheets-Sheet 2
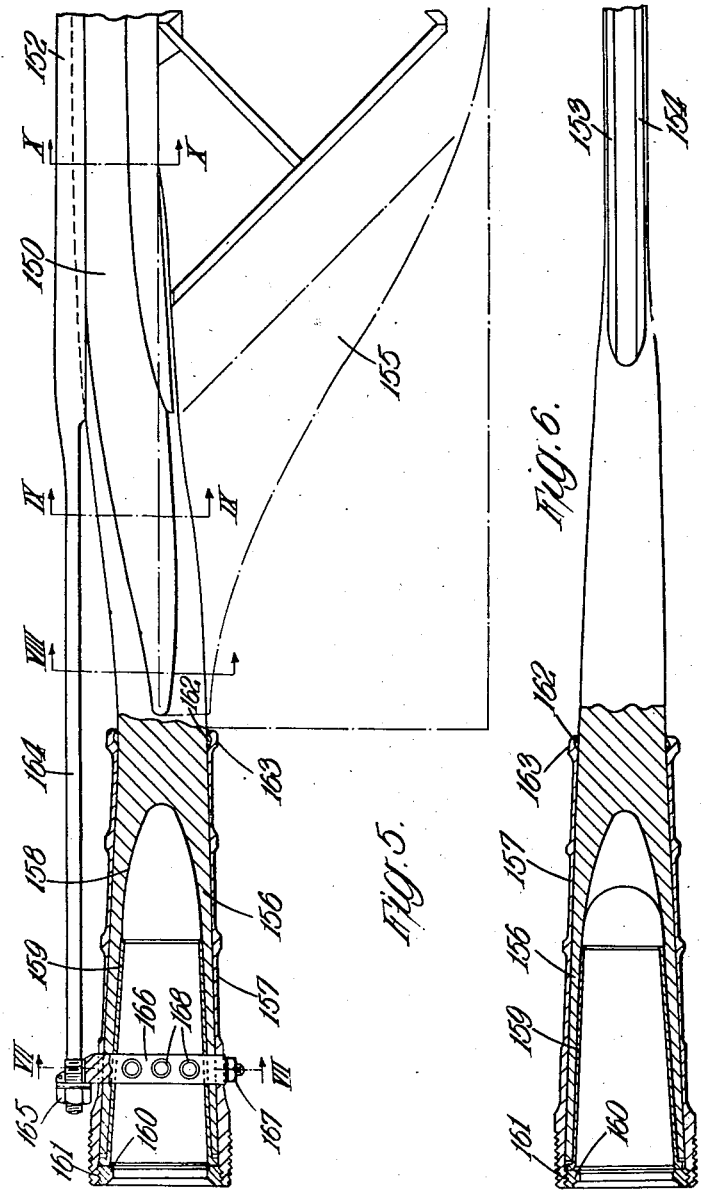
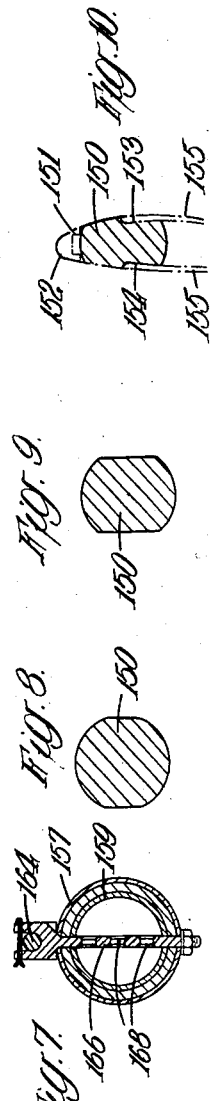
INVENTOR
Cyril George Pullin
ATTORNEYS Dec. 1, 1942.   C. G. PULLIN   2,303,707
ROOT MOUNTING FOR ROTOR BLADES
Filed Jan. 18, 1940   3 Sheets-Sheet 3
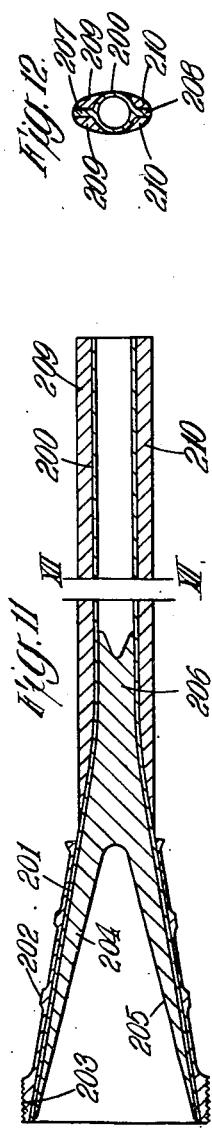
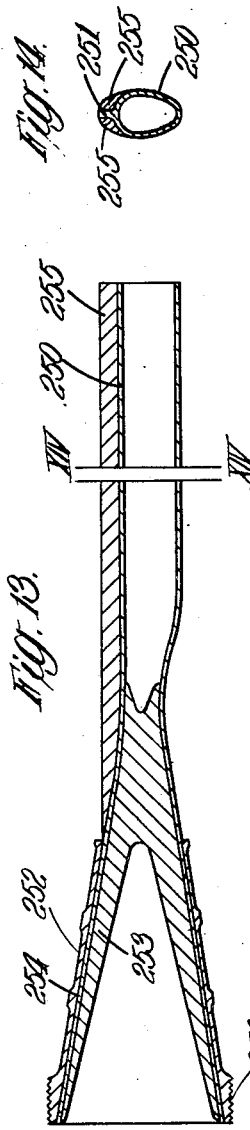
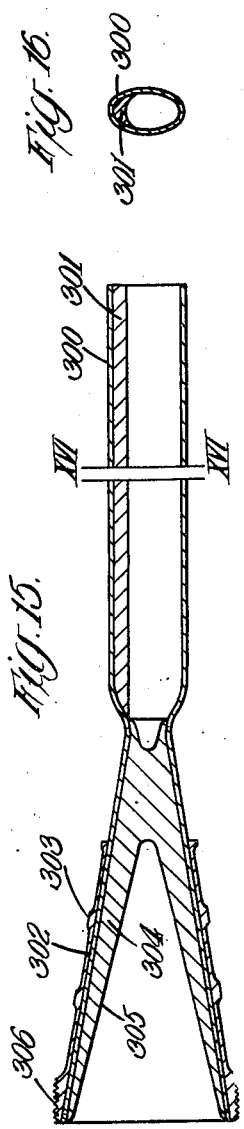
INVENTOR
Cyril George Pullin
ATTORNEYS
Synnestvedt + Lechner Patented Dec. 1, 1942

2,303,707

UNITED STATES PATENT OFFICE 2,303,707

ROOT MOUNTING FOR ROTOR BLADES

Cyril George Pullin, Genista, Newton Mearns, Scotland, assignor to Autogiro Company of America, Willow Grove, Pa., a corporation of Delaware Application January 18, 1940, Serial No. 314,421
In Great Britain December 31, 1938

4 Claims. (Cl. 170—173)

The present invention relates to root mountings for rotor blades, an object of the invention being to provide a root mounting in which peripheral compression of the root portion of the spar increases with increase of tension in the spar due to centrifugal force.

According to the present invention the spar is provided at its root end with a truncated conical portion, the larger end of which is at the extreme root end and is surrounded by a metal root socket in the form of an elongated truncated cone which fits over the conical portion of the spar and is flanged or screw-threaded externally near its larger end to permit of attachment to the rotor hub or to a link or other part associated therewith.

The conical root end of the spar may be integral with the main spar of the rotor blade or may consist partly of a member integral with said main spar and partly of a wedge-shaped member secured thereto. If desired, the root end may be hollow. In this case it is advantageously provided with an internal reinforcing member to increase its resistance to inward compression.

Several forms of construction in accordance with this invention are illustrated by way of example in the accompanying drawings, in which:

Fig. 1 is a plan view partly in section of one form;

Fig. 2 is an elevational view of the form shown in Fig. 1 but with the socket removed;

Fig. 3 is a sectional view on the line III—III of Fig. 1;

Fig. 4 is a sectional view on the line IV—IV of Fig. 1;

Figs. 5 to 10 show a modification, Fig. 5 being a plan view, Fig. 6 an elevational view and Figs. 7, 8, 9 and 10 sectional views on the lines VII, VIII, IX and X of Fig. 5 respectively;

Further alternative constructions are shown in sectional elevation in Figs. 11 and 12, 13 and 14, and 15 and 16, Figs. 12, 14 and 16 being sectional views on the lines XII—XII, XIV—XIV and XVI—XVI of Figs. 11, 13 and 15 respectively.

Referring to Figs. 1 to 4: a rotor blade has a main spar 100 which, as shown in Fig. 4, lies adjacent the leading edge of the blade and has surfaces 101, 102 which form part of the surface of the blade. At its leading edge the spar 100 has a dovetail 103 which extends along its length and onto which a leading edge weight 104 is secured. This weight keeps the sectional center of gravity of the blade well forward, which, as is already known in the art of rotary winged aircraft, is aerodynamically beneficial. Advantageously a ductile metal is used for this leading edge weight to enable it to be rolled onto the dovetail 103. Adjacent its rear edge the spar 100 has checked out portions 105, 106 on its lower and upper surfaces respectively which accommodate the leading edge of sheets of plywood 107, 108 which form the main part of the blade surface. Cross bracing members such as 109 and 110 are provided in the interior of the part of the blade covered by the plywood sheets 107, 108.

As shown in Fig. 1, the main spar 100 is altered in form at its extreme root end which is in the form of one half of a truncated cone 111 (see especially Fig. 3). Secured to the main spar 100 at its extreme root end is an auxiliary wedge-shaped member 112 which completes the conical form of the root end of the blade and which may extend some distance along the blade to assist in withstanding shear and bending moments in the blade. The auxiliary member 112 may be secured in any desired way to the spar 100 and its root end 111, but advantageously it is secured by glueing or by glueing in addition to other securing means.

Preferably the spar 100 and wedge-shaped member 112 are built up of wood laminations which may run vertically or horizontally along the length of the blade. These laminations may be compressed in dies and be secured together by synthetic resin adhesives.

Surrounding the extreme root end 111 of the spar 100 and the auxiliary member 112 is a metal sleeve 113 in the form of an elongated truncated cone. The sleeve is passed over the main spar 100 from its tip end before the auxiliary member 112 is secured thereto. The auxiliary member 112 is then inserted into the sleeve 113 from the root end and secured in position on the spar 100. Before the glue between the spar 100 and the auxiliary member 112 has set, the sleeve 113 is moved axially so as to exert an inward pressure on the extreme root end, this axial pressure being obtained by a pre-loading device (not shown) which presses against the root end of the blade spar and the auxiliary member 112. Advantageously an adhesive such as a thermoplastic synthetic resin is introduced between the sleeve and the root end and in addition a moisture-excluding ring 114 may be held in a recess 115 at the narrower end of the sleeve 113.

The sleeve 113 and the root end of the spar and auxiliary member are apertured at 116 and 117 adjacent the extreme root end for an eye bolt 118 which extends transversely across the sleeve and which may be provided with lightening holes such as 126. The eye bolt 118 passing through the sleeve and the root of the spar prevents relative rotation between them and is held in position by a screw nut 119 at the trailing edge of the spar. At the leading edge the end of the eye bolt 118 is forked, as shown in Fig. 3, the two arms 120 of the fork having holes 121 through which a split pin 122 may be passed. A rod 123, which is a continuation of the leading edge weight 104 towards the root end of the blade, has at its end a screw-threaded part 124 which passes through the space enclosed by the arms 120 of the eye bolt and the split pin 122 and is held in position by a screw nut 125. The centrifugal force acting on the leading edge weight 104 is transmitted by the rod 123 and screw nut 125 to the eye bolt 118 and thence to the sleeve 113 near its root end, thus relieving the spar of this load.

In the alternative construction shown in Figs. 5 to 10, the extreme root end of the blade is hollow. The main spar 150, which is built up of lengthwise wooden laminations in a horizontal or vertical plane, has at its leading edge a dovetail 151 to which is secured a leading edge weight 152 and recesses 153 and 154 at its trailing edge for receiving the plywood blade covering indicated in chain dotted lines at 155. The spar is increased in thickness towards the root end by the addition of circumferential laminations which are wrapped round the spar. These circumferential laminations are arranged to give the extreme root end of the spar a truncated conical shape as indicated at 156, the greatest width or thickness of the spar being at the root end.

A metal sleeve 157 of truncated conical form is threaded over the spar 150 from its tip end and passes along the spar to the root end where it surrounds the conical part 156 of the spar and exerts an inward pressure thereon, this pressure being obtained during manufacture by a pre-loading device (not shown). When the sleeve 157 is in position on the outside of the conical part 156, the interior of the root end is bored out, as shown at 158, and a metal liner 159 is inserted within this bored out portion. The liner 159 is pressed into the root end of the blade by a ring 160 having an external screw thread which engages an internal screw thread 161 at the root end of the sleeve 157. The material of the root end of the spar is thus compressed between the sleeve 157 and the liner 159. If desired, a suitable adhesive such as a thermoplastic synthetic resin may be interposed between the sleeve 157 and the liner 159 and the root end of the spar. The ingress of moisture may be prevented by a ring 162 of rubber or other material housed in a recess 163 at the smaller end of the sleeve 157.

The leadging edge weight 152 is extended towards the root end of the blade by a rod 164 secured by a screw nut 165 to an eye bolt 166 which passes transversely through the root end of the sleeve 157, the spar 150 and the liner 159, which are apertured for this purpose. The eye bolt 166 is secured in position by a screw nut 167 and may be provided with lightening holes such as 168. The general arrangement of the eye bolt and rod 164 is similar to that shown in Figs. 1 and 3.

In the construction shown in Figs. 11 to 16, a hollow spar is used.

Referring to Figs. 11 and 12: a hollow spar 200 is conically increased in diameter, as indicated at 201, at its root end and this part 201 is surrounded by a metal sleeve 202 provided with a screw thread 203 for attachment to a rotor hub member. Within the conical part 201 of the spar is a reinforcing member 204 which is hollowed out conically, as indicated at 205, and which has a part 206 which extends a short distance outwardly within the spar 200. The conical part 201 of the spar is compressed between the liner 202 and the reinforcing member 204 and is advantageously secured to these parts by an adhesive such as a thermo-plastic synthetic resin.

At its leading and trailing edges the spar 200 has flanges 207 and 208. The spar 200 is built up to a generally oval shape by the addition of strips of material 209 and 210 on each side of the flanges 207 and 208 respectively. Advantageously the material 209 is comparatively heavy so as to bring the centre of gravity of the spar towards the leading edge of the blade. For example compressed wood of a specific gravity of about 1.36 may be used for the strips 209 while a somewhat lighter material is used for the strips 210.

In the construction illustrated in Figs. 13 and 14, the main spar 250 has at its leading edge an external flange 251 which extends along its length. The spar 250 is of ovoid form. At its root end the spar is enlarged conically, this enlarged part being clamped between a sleeve 252 and an inner reinforcing member 253 which maintain the root portion 254 under compression. Secured to the leading edge of the spar are strips 255 of comparatively heavy material which tend to bring the centre of gravity of the blade nearer the leading edge. The sleeve 252 has an external screw thread 256 at its root end for attachment to a hub member.

In Figs. 15 and 16 a further alternative construction is illustrated. The spar 300 of oval section has secured within it along its leading edge a weight 301 which extends along the length of the spar. Some distance from the root end of the spar the cross section is changed from oval to circular and from this point towards the root end the diameter increases to form a conical part 302 which is clamped between a sleeve 303 and an inner reinforcing member 304. This reinforcing member 304 extends to the point at which the cross section of the spar changes and is hollowed out as indicated at 305 at the root end. An external screw thread 306 is provided at the root end of the sleeve for attachment to a hub member.

The spars shown in Figs. 11 to 16 are preferably made of improved wood, that is to say wood laminations secured together under pressure with a thermo-plastic synthetic resin. This form of construction allows the spars to be made accurately and reduces errors due to distortion which are prevalent in metal hollow spars. With improved wooden spars, the accuracy of the spar is determined almost entirely by the accuracy of the dies in which the spar is compressed during manufacture.

A further advantage of improved wood for the material of the spars is that any desired shape can readily be obtained, whereas changes of cross section are most difficult to produce in metal spars. The improved wood can readily be machined to any desired shape so that a leading edge weight or plywood covering may be secured to the spar.

What I claim is:

1. A blade for an aircraft sustaining rotor, including a spar having root end attachment means tapered to its greatest size at the extreme root, an elongated tapered sleeve fitted on said portion and an elongated member of relatively high specific gravity extended throughout a major portion of the blade length, said member being supported by said spar and substantially paralleling the spar axis in a zone adjacent the leading side thereof, and further being supported against the action of centrifugal force by connection to said tapered root end attachment means, thereby substantially eliminating bending of the spar due to the action of centrifugal force on the elongated member.

2. A blade for an aircraft sustaining rotor, including a spar having root end attachment means tapered to its greatest size at the extreme root, an elongated tapered sleeve fitted on said portion and an elongated member of relatively high specific gravity extended throughout a major portion of the blade length, said member being supported by said spar and substantially paralleling the spar axis in a zone adjacent the leading side thereof, and further being supported against the action of centrifugal force by connection to anchor means extended transversely through the root end of the spar and sleeve.

3. A blade for an aircraft sustaining rotor, including a spar having a member of relatively high specific gravity extended throughout a major portion of the blade length supported by said spar, said member substantially parallelling the spar axis in a zone adjacent the leading side thereof, the spar having a dovetail recess formed along its leading edge, and the extended member being of ductile material rolled into said dovetail.

4. A blade for an aircraft sustaining rotor, including a spar having hollow root end attachment means tapered to its greatest size at the extreme root, cooperating internal and external tapered members between which the tapered attachment means is compressed, external flanges extended along the leading and trailing edges of said spar, contour-forming material of relatively high specific gravity built up adjacent the leading side of the spar and supported by the leading flange, contour-forming material of a lower specific gravity built up adjacent the trailing side of the spar and supported by the trailing flange, said flanges further being extended into adjacent the compression zone between said tapered members, thereby to reinforce said spar against bending moments.

CYRIL GEORGE PULLIN.